United States Patent
Pisanova et al.

(10) Patent No.: US 7,807,749 B2
(45) Date of Patent: Oct. 5, 2010

(54) POLYMER-ALDEHYDE BINDING SYSTEM FOR MANUFACTURE OF WOOD PRODUCTS

(75) Inventors: Elena Pisanova, Mississauga (CA); Humayun Mandal, Salem, OR (US)

(73) Assignee: Dynea Oy, Helsinki (FI)

( * ) Notice: Subject to any disclaimer, the term of this patent is extended or adjusted under 35 U.S.C. 154(b) by 622 days.

(21) Appl. No.: 11/652,089

(22) Filed: Jan. 11, 2007

(65) Prior Publication Data

US 2007/0167561 A1    Jul. 19, 2007

Related U.S. Application Data

(60) Provisional application No. 60/758,212, filed on Jan. 12, 2006.

(51) Int. Cl.
- *C08K 5/06* (2006.01)
- *C08K 5/07* (2006.01)
- *C08K 5/21* (2006.01)
- *C08K 5/357* (2006.01)
- *C09J 129/04* (2006.01)
- *C09J 103/04* (2006.01)

(52) U.S. Cl. .......................... 525/61; 525/56; 525/154; 525/328.8

(58) Field of Classification Search ............. 525/61, 525/56, 154, 328.8
See application file for complete search history.

(56) References Cited

U.S. PATENT DOCUMENTS

| | | | |
|---|---|---|---|
| 4,395,504 A | 7/1983 | Sulzberg et al. | |
| 4,455,416 A | 6/1984 | Floyd et al. | |
| 4,625,029 A | 11/1986 | Floyd et al. | |
| 4,656,296 A | 4/1987 | Floyd | |
| 4,692,478 A | 9/1987 | Viswanathan et al. | |
| 4,695,606 A | 9/1987 | Floyd et al. | |
| 5,059,488 A | 10/1991 | Detlefsen et al. | |
| 5,545,684 A * | 8/1996 | Jakob et al. | 524/354 |
| 6,054,519 A * | 4/2000 | Jakob et al. | 524/354 |
| 6,348,530 B1 | 2/2002 | Reck et al. | |
| 6,599,455 B2 | 7/2003 | Wierer et al. | |
| 6,730,718 B1 * | 5/2004 | Jakob | 523/201 |
| 6,822,042 B2 | 11/2004 | Capps | |
| 2006/0194918 A1 * | 8/2006 | Pizzi et al. | 524/593 |

FOREIGN PATENT DOCUMENTS

| | | |
|---|---|---|
| DE | 196 36 510 A1 | 3/1998 |
| EP | 0 686 682 A1 | 12/1995 |
| FR | 2 596 404 A1 | 10/1987 |
| FR | 2596404 A1 * | 10/1987 |
| FR | 2 844 802 A1 | 3/2004 |
| WO | WO-01/27214 A1 | 4/2001 |
| WO | WO 2004029170 A1 * | 4/2004 |
| WO | WO-2006/120523 A1 | 11/2006 |

* cited by examiner

*Primary Examiner*—Kelechi C Egwim
(74) *Attorney, Agent, or Firm*—Birch, Stewart, Kolasch & Birch, LLP

(57) ABSTRACT

A formaldehyde-free curable aqueous composition containing a hydroxy-containing polymer, a multi-functional crosslinking agent, and, optionally, a catalyst. The composition is used as a binder for lignocellulosic materials such as plywood, fiber particleboard, medium density fiberboard and oriented strand board.

17 Claims, No Drawings

POLYMER-ALDEHYDE BINDING SYSTEM FOR MANUFACTURE OF WOOD PRODUCTS

This Nonprovisional application claims priority under 35 U.S.C. §119(e) on U.S. Provisional Application No(s). 60/758,212 filed on Jan. 12, 2006, the entire contents of which are hereby incorporated by reference.

FIELD OF THE INVENTION

This invention relates to thermosetting self-crosslinking formaldehyde-free resins, a process for preparing said resins and their use as binders for wood products.

BACKGROUND OF THE INVENTION

Urea-Formaldehyde (UF) resins are widely used as a binder for lignocellulosic material. These formaldehyde-based resins are inexpensive, colorless, and are able to cure fast to form a rigid polymer, thereby providing the finished product with excellent physical properties.

A serious disadvantage of UF resin-bonded wood products is that they slowly emit formaldehyde into the surrounding environment. Due to environmental, health, and regulatory issues related to formaldehyde emissions from wood products, there is a continuing need for alternative formaldehyde-free binders.

A number of formaldehyde-free compositions have been developed for use as a binder for making wood products.

U.S. Pat. No. 4,395,504 discloses the use of formaldehyde-free adhesive system prepared by a reaction of a cyclic urea with glyoxal, for the manufacture of particleboard. Such a system, however, showed a rather slow cure and required low pH for the cure.

U.S. Pat. No. 5,059,488 shows an advantage of glutaraldehyde over glyoxal, when used in a reaction with cyclic urea. The patent discloses the use of glutaraldehyde-ethylene urea resins for wood panel manufacture. It was shown that this resin cured faster than glyoxal-ethylene urea resin, and the cure can be performed at a relatively high pH. However, the glutaraldehyde-based resins are quite expensive.

U.S. Pat. No. 4,692,478 describes a formaldehyde-free binder for particleboard and plywood prepared of carbohydrate raw material. The process comprises hydrolysis of the carbohydrate by a mineral acid, and then neutralizing the resin by ammonia. Although the raw materials are cheap and renewable, the reaction has to be performed at a very low pH (about 0.5) and a high pressure.

U.S. Pat. No. 6,822,042 also discloses the use of a carbohydrate material (corn syrup) for preparing a non-expensive wood adhesive. Advantages of this binder include strong bonding, low cost, and renewable raw material. However, a disadvantage is using isocyanate as a cross-linker for this composition. Toxicity of isocyanates makes them non-desirable for the wood products manufacture.

U.S. Pat. No. 6,599,455 describes a formaldehyde-free binder for producing particleboard containing curable thermoplastic co-polymers and cross-linkers selected from epoxy, isocyanate, N-methylol and ethylene carbonate compounds. Such compositions provide good strength and water resistance when cured, however, they are quite expensive.

U.S. Pat. No. 6,348,530 describes a formaldehyde-free binder for producing shaped wood articles comprising a mixture of hydroxyalkylated polyamines and polycarboxylic acids. The binder preparation is rather complicated and the composition is quite expensive.

U.S. Pat. No. 6,730,718 describes an aqueous dispersion adhesive suitable for bonding porous substrates such as wood panels. This binder comprises a mixture of two polymers: one is a polyvinyl ester, and second is a polymeric protective colloid, such as polyvinyl alcohol. Derivatives of multifunctional aldehydes, such as glyoxal and glutaraldehyde, are used as cross-linkers. The binder solution preferably comprises at least one cure catalyst or accelerator, such as aluminum chloride. The binder was used as a cold-cure wood adhesive applied to both sides. The final product exhibited good strength and water resistance.

Despite these disclosures, there is a growing need for new formaldehyde-free aqueous compositions suitable for use as a binder for wood products, such as plywood or particleboard. It is desirable that such curable compositions contain relatively high amount of non-volatiles, and at the same time are stable, fast-curing and do not emit any toxic fumes during the cure and afterwards.

SUMMARY OF THE INVENTION

The invention is drawn to a curable aqueous composition comprising: (a) a hydroxy-containing polymer; (b) a multi-functional crosslinking agent which is at least one selected from the group consisting of a multifunctional aldehyde and a derivative thereof, and optionally (c) a catalyst; wherein the weight ratio of (a):(b) is from 95:5 to about 10:90.

The invention is also drawn to an application of the above-mentioned composition as an adhesive for bonding lignocellulosic material such as for the manufacture of particleboard, plywood, oriented strand board and the like.

DETAILED DESCRIPTION OF THE INVENTION

In an embodiment of the invention is a curable aqueous composition comprising: (a) a hydroxy-containing polymer; (b) a multi-functional crosslinking agent which is at least one selected from the group consisting of a multifunctional aldehyde and a derivative thereof, and optionally (c) a catalyst; wherein the weight ratio of (a):(b) is from 95:5 to about 10:90. Preferably, the weight ratio of (a):(b) is from 90:10 to 25:75, and most preferably, the weight ratio of (a):(b) is from 75:25 to 40:60.

In another embodiment of the invention is a curable aqueous composition consisting essentially of: (a) a hydroxy-containing polymer; (b) a multi-functional crosslinking agent which is at least one selected from the group consisting of a multifunctional aldehyde and a derivative thereof, and optionally (c) a catalyst; wherein the weight ratio of (a):(b) is from 95:5 to about 10:90. Herein the transitional phrase "consisting essentially of" means that the composition may contain additional components so long as the added components do not materially affect (positively or negatively) the properties of the composition as a binder for wood products.

In another embodiment of the invention, is a composite product comprising a lignocellulosic material and a curable aqueous composition, wherein the curable aqueous composition comprises: (a) a hydroxy-containing polymer; (b) a multi-functional crosslinking agent which is at least one selected from the group consisting of a multifunctional aldehyde and a derivative thereof, and optionally (c) a catalyst; wherein the weight ratio of (a):(b) is from 95:5 to about 10:90. The lignocellulosic material is plywood, fiber particleboard, medium density fiberboard or oriented strand board.

In another embodiment of the invention is a method of forming a composite product, comprising applying the curable aqueous composition to the lignocellulosic material. The concentration in which the curable aqueous composition is applied to the lignocellulosic material depends on the type of application.

Once the curable aqueous composition is applied to the lignocellulosic material, the product is preferably then heated to at least 90° C. for curing. More preferably, the product is heated to at least 105° C. Typically, the product is pressed during curing. The pressure applied is dependent upon the type of product to be manufactured. The heat treated product is then cooled to room temperature at which point the cured composition shows appreciable adhesive strength.

The concentration of the hydroxy-containing polymer (a) in the curable aqueous composition is at least 10 wt %. Preferably, the concentration is 25 wt % to 80 wt %. Most preferred, the concentration range is 35 wt % to 65 wt %, wherein the wt % is based on the weight of the solids content in the curable aqueous composition.

The concentration of the (b) multi-functional crosslinking agent in the curable aqueous composition is at least 5 wt %. Preferably, the concentration is 15 wt % to 75 wt %. Most preferred, the concentration range is 25 wt % to 65 wt %, wherein the wt % is based on the weight of the solids content in the curable aqueous composition.

Hydroxy-containing polymers useful in the present invention include polyvinyl alcohol (PVOH) and co-polymers of ethenol with vinyl acetate or other monomers such as, for example, vinyl esters. Another group of hydroxy-containing polymers comprises polysaccharides found in renewable sources such as vegetable starch, cornstarch or corn syrup.

In an embodiment of the invention, the PVOH is used as a hydroxy-containing polymer. Preferably, the PVOH has a viscosity of up to 10 centipoise in a 4wt % aqueous solution at 20° C. More preferably the PVOH has a viscosity of 3.5 to 7.0 cps, and most preferably, the PVOH has a viscosity of 4.5 to 6.0 cps. The viscosity is measured using a Brookfield viscometer at 25° C. Preferably, the PVOH has a number average molecular weight of up to 85,000. More preferably the PVOH has a number average molecular weight of 5,000 to 55,000, and most preferably, the PVOH has a number average molecular weight of more than 7,000 to 23,000.

In an embodiment of the invention, the PVOH is a partially hydrolyzed polyvinyl acetate, or is a copolymer of ethenol and vinyl acetate. Fully hydrolyzed grades of PVOH, i.e., at least 98 mole % hydrolyzed, provide high tensile strength of the final product. However, these fully hydrolyzed grades are characterized by a higher viscosity of aqueous solutions. Preferably, the PVOH is from 70 mole % to 98 mole % hydrolyzed. More preferably, the PVOH is from 80 mole % to 90 mole % hydrolyzed.

As cross-linkers of hydroxy-containing polymers, multi-functional aldehydes are used in the present invention. These multifunctional aldehydes have at least two aldehyde groups capable of reacting with the alcohol moieties on the polymer chain and are preferably non-polymeric. Preferably, the non-polymeric multifunctional aldehyde is at least one selected from the group consisting of glyoxal, malonaldehyde, succinaldehyde, glutaraldehyde, 2-hydroxyglutaraldehyde, β-methylglutaraldehyde, pimelaldehyde, suberaldehyde, malealdehyde, fumaraldehyde, sebacaldehyde, phthalaldehyde, isophthalaldehyde, terephthalaldehyde, and ring-substituted aromatic aldehydes. Most preferably, the nonpolymeric multifunctional aldehyde is at least one of glyoxal, glutaraldehyde or dialdehyde-starch. Multifunctional aldehydes can be effective crosslinkers of hydroxy-containing compounds. However, a disadvantage of such a high activity may be a low stability of the binder due to reactions of multifunctional aldehyde with other components of the composition before the curing. To prevent these undesirable reactions, a derivative of the multifunctional aldehyde can be used, i.e., the multifunctional aldehyde can be blocked by reaction with a blocking agent at most or all of the aldehyde groups on the multifunctional aldehyde before adding to the composition, as it was described in U.S. Pat. Nos. 4,695,606; 4,625,029, and 4,656,296, each of which is incorporated herein by reference in their entirety. The blocking agent inhibits the multifunctional aldehyde from reacting with other components prior to addition of catalyst and application to substrates. As such, it is preferred that the multifunctional aldehyde is added to the hydroxy-containing polymer in the blocked form.

Suitable blocking agents include N, S, and O-nucleophiles, capable of forming adducts with aldehyde group. Examples of N-nucleophiles are urea, substituted noncyclic ureas (such as linear ureas like dimethyl urea or branched ureas such as diisopropyl urea), various cyclic ureas, carbamates (such as isopropyl or methyl carbamate), as well as aliphatic amines and amides. Suitable S-nucleophiles are sodium bisulfite or potassium bisulfite. Example of suitable O-nucleophiles are aliphatic monoalcohols, glycols, and polyols (i.e. containing at least three hydroxy groups). The polyol may be any of a wide variety of materials, including but not limited to ethylene glycol, diethylene glycol, polyethylene glycols having the formula $HO(CH_2CH_2O)_nH$ where n is 1 to about 50, and the like, and their mixtures. When the blocking agent is an O-nucleophile, the O-nucleophile is other than the "hydroxy-containing polymer" of the present invention. It is preferred to use a single type of blocked aldehyde. Herein the term "non-polymeric" means that if the multifunctional aldehyde is formed in a polymerization reaction, that the multifunctional aldehyde has a molecular weight which is at most, the molecular weight associated with oligomers. Preferably, the multifuinctional aldehyde has a molecular weight of less than 400 g/mole. Most preferably, the multifunctional aldehyde has a molecular weight of less than 250 g/mole.

The preferred cyclic ureas are as follows:

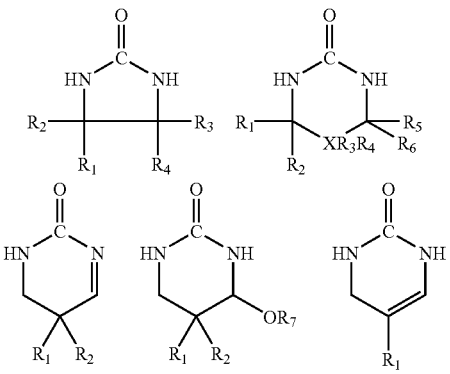

wherein $R_1$, $R_2$, $R_3$, $R_4$, $R_5$, and $R_6$ may be the same or different and each may be H, OH, COOH, R, OR, or COOR wherein R is an alkyl or a substituted alkyl group having 1 to 4 carbon atoms; $R_7$ may be H or a polyol moiety such as $C_2H_4OH$, $CH_2CH_2O(C_2H_4O)_bH$ where b is 0 to 10, $CH_2CH(OH)CH_2OH$, $[CH_2CH(CH_3)O]H_c$ where c is 1 to 10, and the like; and X may be C, O, or N; when X is O, $R_3$ or $R_4$ is each zero; when X is N, $R_3$ or $R_4$ is zero.

Typical examples of such compounds include, but are not limited to, ethylene urea, propylene urea, uron, tetrahydro-5-(2-hydroxyethyl)-1,3,5-triazin-2-one, 4,5-dihydroxy-2-imidazolidone, 4,5-dimethoxy-2-imidazolidinone, 4-methyl ethylene urea, 4-ethyl ethylene urea, 4-hydroxyethyl ethylene urea, 4,5-dimethyl ethylene urea, 4-hydroxy-5-methyl propylene urea, 4-methoxy-5-methyl propylene urea, 4-hydroxy-5,5-dimethyl propylene urea, 4-methoxy-5,5-dimethyl propylene urea, tetrahydro-5-(ethyl)-1,3,5-triazin-2-one, tetrahydro-5-(propyl)-1,3,5-triazin-2-one, tetrahydro-5-(butyl)-1,3,5-triazin-2-one, dihydro-5-methyl-2(1H, 3H) pyrimidinone, dihydro-5, 5-dimethyl-2 (1H) pyrimidinone, tetrahydro-4-5-methyl-2 (1H) pyrimidinone, tetrahydro-4-(2-hydroxyethyl)-5,5-dimethyl-2 (1H) pyrimidinone, and the like, and mixtures of these.

Among the cyclic ureas suitable for use in preparing the condensates are tetrahydropyrimidinones that are prepared from urea, formaldehyde, an aldehyde having at least two carbon atoms and at least one a proton, a catalytic amount of acid, and a solvent.

Other suitable polyols (i.e. containing at least three hydroxy groups) can be used as the blocking agent, such as glycerin, (to make 2,3-dihydroxy-5-hydroxymethyl dioxane) as well as unalkylated or partially alkylated polymeric glyoxal derived glycols such as poly (N-1',2'-dihydroxyethyl-ethylene urea), dextrans, glyceryl monostearate, ascorbic acid, erythrobic acid, sorbic acid, ascorbyl palmitate, calcium ascorbate, calcium sorbate, potassium sorbate, sodium ascorbate, sodium sorbate, monoglycerides of edible fats or oils or edible fat-forming acids, inositol, sodium tartrate, sodium potassium tartrate, glycerol monocaprate, sorbose monoglyceride citrate, polyvinyl alcohol, α-D-methylglucoside, sorbitol, dextrose, and their mixtures.

As noted above, it is preferred that the multifuinctional aldehyde is added to the hydroxy-containing polymer in the blocked form. As such, there is preferably essentially no free amino compound added to the inventive adhesive composition.

The blocked multifunctional aldehydes preferably have infinite water dilutability and are stable to gellation over a period of at least one month.

Preferably, the blocking agent is a urea or cyclic urea because the blocked glyoxal resins formed are very stable providing long shelf life to the forrnaldehyde-free curable aqueous composition of this invention.

In an embodiment of the invention, the formaldehyde-free curable aqueous composition of this invention may optionally be neutralized with a base. In particular, pH adjusters such as ammonium hydroxide, sodium hydroxide, polyethyleneimine (PEI) and potassium hydroxide are added to the solution containing the crosslinking agent to raise the pH of the crosslinking agent solution prior to adding the crosslinking agent solution to the hydroxy-containing polymer. The preferred pH for the crosslinking agent solution to be added to hydroxy-containing polymer is from about 1.5 to about 7.5 and more preferred is the range of about 4.0 to about 7.0 with the range of about 4.5 to 5.5 being the most preferred.

In an embodiment of the invention, the formaldehyde-free curable aqueous composition of this invention may optionally contain cure accelerators (catalysts). The catalyst according to the present invention is selected from the group consisting of Lewis acids, such as ammonium chloride, ammonium sulphate, aluminum sulphate, aluminum chloride, aluminum nitrate, and Bronsted acids, such as p-toluenesulfonic acid, phosphoric acid, and mixtures thereof. Preferably, the catalyst is added in a concentration of at least 0.25 wt %. More preferably, the catalyst is added in a concentration of 0.5 wt % to 5 wt %. The weight % is based on the amount of the hydroxy-containing polymer and the multifunctional aldehyde.

In an embodiment of the invention, the curable aqueous composition includes other components, e.g. emulsifiers, plasticizers, anti-foaming agents, biocide additives, anti-mycotics including, e.g., fungicides and mold inhibitors, adhesion promoting agents, colorants, waxes, antioxidants, corrosion inhibitors, fillers and extenders and combinations thereof. These components and their workable concentrations are known in the art. Polydentate ligands/complexing agents can be used but it is preferred that the adhesive composition does not include polydentate ligands/complexing agents.

The fillers are added to control (increase) the adhesive viscosity. It is preferred to use starch as the filler. More preferred is to use wheat flour, soy flour or combinations of different flours. Although inorganic fillers (such as silica or clay) may be used, it is preferred that the curable aqueous composition does not have inorganic fillers.

The extenders are preferably nut shell flours. More preferred is the use of walnut shell flour, pecan shell flour, coconut shell flour or mixtures of different nut shell flours may be used.

The solids content (also referred to herein as "nonvolatiles percent") of adhesive composition of the present invention is preferably 30wt % to 55wt %, with particular preference from 35wt % to 50wt %.

The curable aqueous composition of the invention can be used as adhesives for lignocellulosic substrates such as wood. One specific field of application is veneer gluing. More specific applications are binders for wood particleboard and medium density fiberboard; flooring, wall and ceiling adhesives; binders for textiles and non-wovens.

It should be emphasized that the adhesives of the present invention are, advantageously, systems which are also isocyanate free, and to a substantial extent, formaldehyde free.

EXAMPLES

The number average molecular weight of the polymers is measured by GPC using polystyrene standards.

Example 1

Control

PVOH solution was prepared by adding a sufficient amount of solid PVOH (Celvol 502 by Celanese, 88.5% hydrolyzed) to water to form a 35wt % solution. The mixture was stirred at 80° C. until complete dissolution, and then cooled down to room temperature. 100 grams of PVOH solution were mixed with 31 grams of 40wt % glyoxal. The final composition was clear, homogeneous, and had infinite water dilutability. However, it gelled in 10 minutes at room temperature. This example shows that unblocked glyoxal cannot be used with concentrated PVOH solutions.

Example 2

Preparation of Blocked Glyoxal (1)

Urea-Glyoxal Condensate (UG-1; 1:3 Molar Ratio):

To a 1-liter 3-necked flask equipped with a mechanical stirrer, reflux condenser, and thermometer were charged 225 grams of glyoxal (40wt %) and 30.0 grams of urea. Low heat was applied with constant stirring and the temperature gradually increased to 45° C. After 15 minutes, a uniform solution was obtained. The condensation mixture was held at a constant temperature of 45° C. with constant stirring for the next 4.5 hours. At the end of this period, the pH of the solution was 2.1. The condensation mixture was cooled to 25° C., and pH was adjusted to 6.9 by 50% sodium hydroxide. The resulting product (UG-1), a colorless clear liquid had 47 wt % solids, and viscosity 270 cps. The composition was stable for at least 3 months.

Example 3

Preparation of Blocked Glyoxal (2)

Urea-Glyoxal Condensate (UG-2; 1:2 Molar Ratio):

The procedure of Example 2 was repeated with an exception that 150 grams of glyoxal (40wt %) and 30.0 g urea were used. At the end of the cook, the resin was neutralized by 50% sodium hydroxide and then concentrated by removing water under vacuum at 50° C. The resulting product (UG-2) was a clear colorless liquid with 63 wt % solids, pH=6.3, and viscosity 960 cps. The composition was stable for at least 3 months.

Example 4

Preparation of Blocked Glyoxal (3)

Urea-Glyoxal Condensate (UG-3; 1:2 Molar Ratio):

The procedure of Example 3 was repeated with an exception that at the end of the cook, the resin was neutralized by slow addition of 50% of polyethyleneimine (PEI, from Aldrich, Mn=423). The resulting product (UG-3) was a clear dark-yellow liquid with 56wt % solids, pH=6.2, and viscosity 460 cps. The composition was stable for at least 3 months.

Example 5

400 grams of 35wt % aqueous solution of PVOH (Celvol 502 by Celanese, 88.5% hydrolyzed) were mixed at room temperature with 60 grams of UG-1 condensate (Example 2), at a ratio of 5:1 (by weight per solids). The resin composition had pH=6.5, 36% solids, and viscosity 2170 cps.

Example 6

100 grams of 35wt % aqueous solution of PVOH (Celvol 502 by Celanese, 88.5% hydrolyzed) were mixed at room temperature with 372 grams of UG-1 condensate (Example 2), at a ratio of 1:5 (by weight per solids). The resin composition had pH=6.3, 44% solids, and viscosity 370 cps.

Example 7

38 grams of solid PVOH (Celvol 502 by Celanese, 88.5% hydrolyzed) were added to 212 grams of water and stirred at 80° C. until complete dissolution, and then cooled down to 50° C. 104 grams of cornstarch were added slowly at constant stirring. The temperature was then raised to 65° C., and the slurry was stirred for 10 minutes, and then cooled to 25° C. 225 grams of UG-2 (Example 3) were added to the slurry, and the composition was stirred at 25° C. for 10 minutes. The final composition had pH=5.7, 49% solids, and viscosity 1450 cps.

Example 8

To 276 grams of the composition of Example 7, 24 grams of poly (vinyl acetate) (VINAC DPN 217, from Air Products and Chemicals Inc) were added. The mixture was stirred at 25° C. for 10 minutes. The final composition had pH=5.7, 49% solids, and viscosity 1460 cps.

Example 9

The procedure of Example 7 was repeated with the exception that UG-3 (Example 4) was used instead of UG-2. The final composition had pH=5.6, 47% solids, and viscosity 1150 cps.

Example 10

To 279 grams of composition of Example 9, 21 grams of poly (vinyl acetate) were added. The mixture was stirred at 25° C. for 10 minutes. The final composition had pH=5.6, 47% solids, and viscosity 1160 cps.

Example 11

Preparation and Testing of 3-Ply ⅜"Douglas-Fir Panels

Typical adhesive mixes for hardwood plywood contain a catalyst and an agent for viscosity control. The resin compositions were mixed with Duram wheat flour until the viscosity reached about 4000 cps at 22° C. 2wt % of catalyst (Aluminum Nitrate or Ammonium Nitrate) was added to each composition. The resulting mixture was well stirred. In a typical run, the time between mixing of the adhesive and its application to the substrate was 30 minutes.

The adhesive mixture was applied to 12"×12"×⅛" poplar veneer at a spread rate of 20 g per square foot. This corresponds to a spread rate of 90lbs per 1000 ft$^2$ of double glueline (MDGL), which is typical for the hardwood plywood industry.

The assembled veneers were placed in a press at 235° F. and pressed at approximately 150 psi for 5 minutes. Note that panels prepared with this type of adhesive show poor bonding results immediately out of the press due to the thermoplastic nature of the adhesive. Bond improvements are observed as the panel cools and on standing at ambient temperatures overnight.

As a control resin, a generic urea-formaldehyde (UF) resin from Dynea was used. The dry shear strength and % wood failure were measured by the ANSI/HPVA HP-1-2004 method. Results are given in Table 1.

TABLE 1

Properties of 3-ply Hardwood/Plywood panels

| Example | Catalyst | Wood Failure, % | Dry Shear Strength, psi |
|---|---|---|---|
| Control (UF resin) | NH$_4$Cl | 83 | 233 |
| 5 | Al(NO$_3$)$_3$ | 67 | 246 |
| 6 | "—" | 75 | 250 |
| 7 | NH$_4$NO$_3$ | 37 | 257 |
| 8 | "—" | 63 | 342 |
| 10 | "—" | 73 | 380 |

These results show that the inventive compositions can be used as plywood adhesives. Examples 5 and 6 show that the ratio of PVOH:UG can be varied in a wide range. Comparison of the results from Examples 7, 8 and 10 show that addition of poly (vinyl acetate) results in a further increase of bond strength.

Example 12

Preparation and Testing of MDF Composites

Wood fibers (Ponderosa Pine Fiber) were blended with the binder composition using a rotating drum laboratory blender.

The resin was sprayed into the wood particles using a spray-atomizer at 8.0% resin loading. Before spraying, the resin compositions were diluted to the viscosity 250-300 cps. Ammonium nitrate was used as a catalyst. Hot pressing and curing for MDF boards were done the same way as they were for particle boards. Internal bond strengths for MDF boards were measured according to ASTM D-1037 test method.

As a control resin, a generic melamine-urea-formaldehyde (MUF) from Dynea was used. Results from the MDF board testing are given in Table 2 below.

TABLE 2

Properties of MDF composites

| Example | Catalyst, % | Density, lbs/ft$^3$ | IB, psi |
| --- | --- | --- | --- |
| Control (MUF resin) | Ammonium sulfate, 2% | 43.3 | 46 |
| 9 | Ammonium nitrate, 2% | 39.3 | 42 |

These results show that the inventive formaldehyde-free composition can be used as an adhesive for MDF application, providing a bond strength comparable to standard formaldehyde-based adhesives.

Example 13

Preparation and Testing of Particleboard Samples

To test for the properties of the adhesive on particleboard, wood particles are blended with the binder composition using a rotating drum laboratory blender. The resin is sprayed into the wood particles using a spray-atomizer at a 6.0% resin loading. The firnish moisture content is maintained at 4.2%. Before spraying, the resin compositions are diluted to the viscosity of 250-300 cps. Ammonium Nitrate is used as a catalyst.

Hot pressing is performed for 230 seconds at 340° F. under 500 psi pressure. Hot press cycle times are generally short at the beginning and are progressively increased until "full cure" conditions are attained. Full cure is defined as the point when the internal bond (IB) strength no longer increases with increased hot press cycle time. In the sequential hot pressing process, this point can be estimated via thickness checks of finished boards as they are removed from the press.

As each hot pressing cycle is completed, the finished boards are cooled to ambient laboratory temperature and humidity. The boards are allowed to cool and equilibrate at these conditions for a minimum of 12-hrs prior to testing. After conditioning, the boards are trimmed and cut-up into IB test specimens and the specimens are tested according to the ASTM D-1037 test method.

What is claimed is:

1. A curable aqueous composition for bonding lignocellulosic material comprising:
    (a) a hydroxy-containing polymer;
    (b) a multi-functional crosslinking agent which is a multi-functional aldehyde selected from the group consisting of glyoxal or glutaraldehyde, wherein the multifunctional aldehyde is blocked by reaction with a blocking agent before adding to the curable aqueous composition, and wherein the blocking agent is at least one selected from the group consisting of urea, and ethylene urea and optionally
    (c) a catalyst;
wherein the weight ratio of (a):(b) is from 95:5 to about 10:90, and wherein the multi-functional crosslinking agent is in a concentration of at least 25 wt % based on the weight of the solids content in the curable aqueous composition.

2. The curable aqueous composition of claim 1, wherein said hydroxy-containing polymer is polyvinyl alcohol.

3. The curable aqueous composition of claim 1, wherein the polyvinyl alcohol has a viscosity up to 10 centipoise when in a 4 wt % aqueous solution at 20° C. using a Brookfield viscometer at ambient pressure.

4. The curable aqueous composition of claim 1, wherein the polyvinyl alcohol has a number average molecular weight in the range of 7,000 to 85,000.

5. The curable aqueous composition of claim 2, wherein the multi-functional crosslinking agent is a blocked glyoxal blocked by reaction with a blocking agent which is at least one selected from the group consisting of urea and ethylene urea.

6. The curable aqueous composition of claim 1, wherein pH is in the range of about 2.5 to about 6.0.

7. The curable aqueous composition of claim 2, wherein the catalyst is selected from a group consisting of ammonium chloride, aluminum salt, phosphoric acid, p-toluenesulfonic acid, and mixtures thereof.

8. The curable aqueous composition of claim 7, wherein the aluminum salt is aluminum sulphate, aluminum chloride, aluminum nitrate or mixtures thereof.

9. The curable aqueous composition of claim 1, wherein the solids content is 30-55wt %.

10. A composite product comprising a lignocellulosic material and a cured adhesive, wherein the cured adhesive is prepared by curing an aqueous composition comprising:
    (a) a hydroxy-containing polymer;
    (b) a multi-functional crosslinking agent which is a multi-functional aldehyde selected from the group consisting of glyoxal or glutaraldehyde, wherein the multifunctional aldehyde is blocked by reaction with a blocking agent before adding to the curable aqueous composition, and wherein the blocking agent is at least one selected from the group consisting of urea and ethylene urea and optionally
    (c) a catalyst;
wherein the weight ratio of (a):(b) is from 95:5 to about 10:90, and wherein the multi-functional crosslinking agent is in a concentration of at least 25 wt % based on the weight of the solids content in the curable aqueous composition.

11. The composite product of claim 10, wherein said hydroxy-containing polymer is polyvinyl alcohol.

12. The composite product of claim 11, wherein the lignocellulosic material is plywood.

13. The composite product of claim 11, wherein the lignocellulosic material is fiber particleboard, medium density fiberboard or oriented strand board.

14. A method of forming a composite product, comprising applying a curable aqueous composition to lignocellulosic material and curing to form the composite product, wherein the curable aqueous composition comprises:
    (a) a hydroxy-containing polymer;
    (b) a multi-functional crosslinking agent which is a multi-functional aldehyde selected from the group consisting of glyoxal or glutaraldehyde, wherein the multifunctional aldehyde is blocked by reaction with a blocking agent before adding to the curable aqueous composition, and wherein the blocking agent is at least one selected from the group consisting of urea and ethylene urea, and optionally
    (c) a catalyst;

wherein the weight ratio of (a):(b) is from 95:5 to about 10:90, and wherein the multi-functional crosslinking agent is in a concentration of at least 25 wt % based on the weight of the solids content in the curable aqueous composition.

15. The method of claim 14, wherein said hydroxy-containing polymer is polyvinyl alcohol.

16. The method of claim 15, wherein the lignocellulosic material is plywood.

17. The method of claim 15, wherein the lignocellulosic material is fiber particleboard, medium density fiberboard or oriented strand board.

* * * * *